(12) United States Patent
Olkin

(10) Patent No.: US 10,191,897 B1
(45) Date of Patent: Jan. 29, 2019

(54) DATA FLOW VIEW FOR A SPREADSHEET

(71) Applicant: Workday, Inc., Pleasanton, CA (US)

(72) Inventor: Terry M. Olkin, Niwot, CO (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 15/133,078

(22) Filed: Apr. 19, 2016

(51) Int. Cl.
   *G06F 17/00* (2006.01)
   *G06F 17/24* (2006.01)
   *G06F 17/30* (2006.01)

(52) U.S. Cl.
   CPC ...... *G06F 17/246* (2013.01); *G06F 17/30864* (2013.01)

(58) Field of Classification Search
   CPC .................................................. G06F 17/246
   See application file for complete search history.

(56) References Cited

U.S. PATENT DOCUMENTS

| | | | | |
|---|---|---|---|---|
| 9,158,832 B1* | 10/2015 | Hiatt | | G06F 17/2247 |
| 2002/0023105 A1* | 2/2002 | Wisniewski | | G06F 17/246 |
| | | | | 715/212 |
| 2007/0050697 A1* | 3/2007 | Lewis-Bowen | | G06F 17/246 |
| | | | | 715/212 |
| 2008/0028287 A1* | 1/2008 | Handsaker | | G06F 17/246 |
| | | | | 715/212 |
| 2009/0089067 A1* | 4/2009 | Campbell | | G06Q 10/10 |
| | | | | 705/344 |
| 2013/0117651 A1* | 5/2013 | Waldman | | G06F 17/246 |
| | | | | 715/220 |

* cited by examiner

*Primary Examiner* — Andrew T McIntosh
(74) *Attorney, Agent, or Firm* — Van Pelt, Yi & James LLP

(57) ABSTRACT

The system includes an input interface and a processor. The input interface is to receive a spreadsheet and an indication of a spreadsheet cell of interest. The processor is to determine a first set of spreadsheet cells that the spreadsheet cell of interest depends on, determine a second set of spreadsheet cells that depend on the spreadsheet cell of interest, provide a spreadsheet cell data flow view for the spreadsheet cell of interest based at least in part on the first set of spreadsheet cells and the second set of spreadsheet cells, and in the event an indication of a new spreadsheet cell of interest is received, provide a spreadsheet cell data flow view for the new spreadsheet cell of interest.

19 Claims, 11 Drawing Sheets

US 10,191,897 B1

DATA FLOW VIEW FOR A SPREADSHEET

BACKGROUND OF THE INVENTION

A business database system stores business information including personnel information, financial information, technical information, etc. Spreadsheets within a business database system can be used for many data management tasks, including data organization, performing large calculations, etc. Spreadsheets often include large numbers of calculations that depend on one another, creating a problem for a user where it becomes difficult to determine which cells depend on which other cells or which sheets depend on which other sheets.

BRIEF DESCRIPTION OF THE DRAWINGS

Various embodiments of the invention are disclosed in the following detailed description and the accompanying drawings.

FIG. 7 is a flow diagram illustrating an embodiment of a process for determining spreadsheets of a set of spreadsheets that a spreadsheet of interest depends on.

FIG. 9 is a flow diagram illustrating an embodiment of a process for determining a first set of spreadsheet cells that a spreadsheet cell of interest depends on.

DETAILED DESCRIPTION

Figure 1:
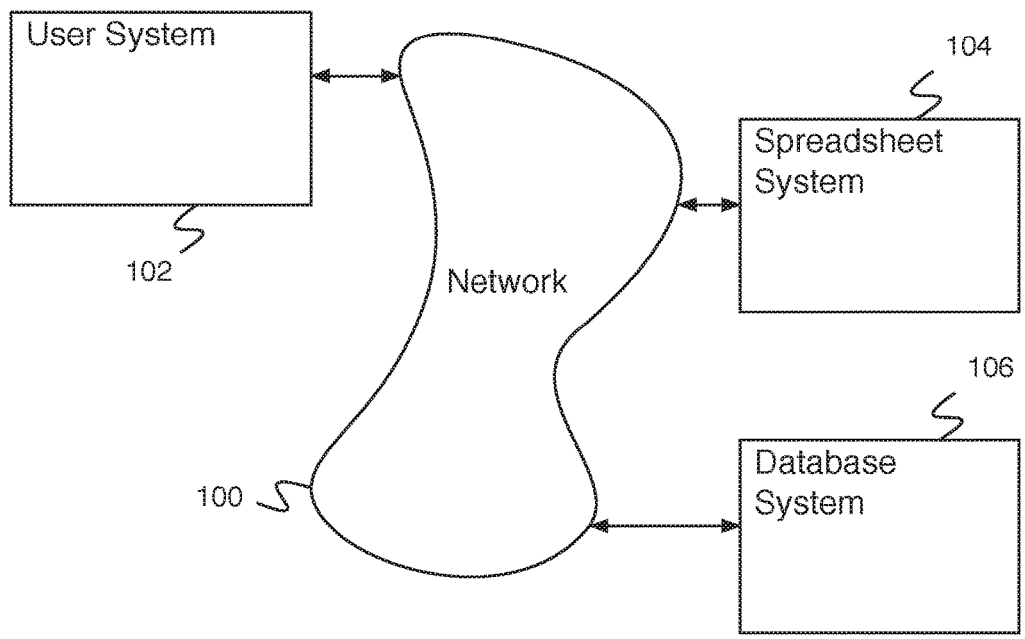
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a data flow view for a spreadsheet is disclosed. The system comprises an input interface and a processor. The input interface is to receive a spreadsheet and an indication of a spreadsheet cell of interest. The processor is to determine a first set of spreadsheet cells that the spreadsheet cell of interest depends on, determine a second set of spreadsheet cells that depend on the spreadsheet cell of interest, provide a spreadsheet cell data flow view for the spreadsheet cell of interest based at least in part on the first set of spreadsheet cells and the second set of spreadsheet cells, and in the event an indication of a new spreadsheet cell of interest is received, provide a spreadsheet cell data flow view for the new spreadsheet cell of interest.

A system for a data flow view for a spreadsheet is disclosed. In some embodiments, a system for a data flow view for a spreadsheet comprises a system for displaying spreadsheet data using a data flow view. In some embodiments, a system for a data flow view for a spreadsheet comprises a system for providing a spreadsheet data flow view comprising a spreadsheet of interest, a set of spreadsheets the spreadsheet of interest depends on, and a set of spreadsheets that depend on the spreadsheet of interest. In some embodiments, a system for a data flow view for a spreadsheet comprises a system for providing a spreadsheet cell data flow view comprising a spreadsheet cell of interest, a set of spreadsheet cells the spreadsheet cell of interest depends on, and a set of spreadsheet cells that depend on the spreadsheet cell of interest.

In some embodiments, the system for a data flow view for a spreadsheet comprises a system for providing a set of views for a spreadsheet. A flow view easily indicates cell dependencies or sheet dependencies so that a user is able to readily understand when cells or sheets are linked by dependencies. In some embodiments, based on an indication provided by a user, the system for a data flow view for a spreadsheet transitions from a spreadsheet data flow view to a spreadsheet data flow view focused on a different spreadsheet of interest, a spreadsheet view, or a spreadsheet cell data flow view. In some embodiments, based on an indication provided by a user, the system for a data flow view for a spreadsheet transitions from a spreadsheet view to a spreadsheet data flow view or a spreadsheet cell data flow view. In some embodiments, based on an indication provided by a user, the system for a data flow view for a spreadsheet transitions from a spreadsheet cell data flow view to a spreadsheet cell data flow view focused on a different cell of interest, a spreadsheet cell edit interface, a spreadsheet view, a spreadsheet data flow view, or a spreadsheet data source reference view.

FIG. 1 is a block diagram illustrating an embodiment of a network system. In some embodiments, the network system of FIG. 1 comprises a system for a data flow view for a spreadsheet. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, spreadsheet system 104, and database system 106 communicate via network 100. User system 102 comprises a system for a user. In various embodiments, user system 102 comprises a system for a user to access a spreadsheet application on spreadsheet system 104, to access data on database system 106, to create data structures on database system 106, to indicate removal of data structures on database system 106, or for any other appropriate purpose. In some embodiments, user system 102 comprises a processor and a memory. Spreadsheet system 104 comprises a system for providing a spreadsheet application for users as a service. In some embodiments, spreadsheet system 104 enables multiple users to access a spreadsheet from multiple user systems (e.g., similar to user system 102). In some embodiments, spreadsheet system 104 comprises a processor and a memory. In some embodiments, spreadsheet system 104 stores data on and accesses data from a database system (e.g., database system 106). Database system 106 comprises a system for managing a database. In some embodiments, database system 106 comprises a system for managing an object-based database. In some embodiments, database system 106 comprises a system for storing data provided by a user (e.g., via user system 102 and network 100). In some embodiments, database system 106 comprises a system for searching data. In some embodiments, database system 106 comprises a processor and a memory.

Figure 2:
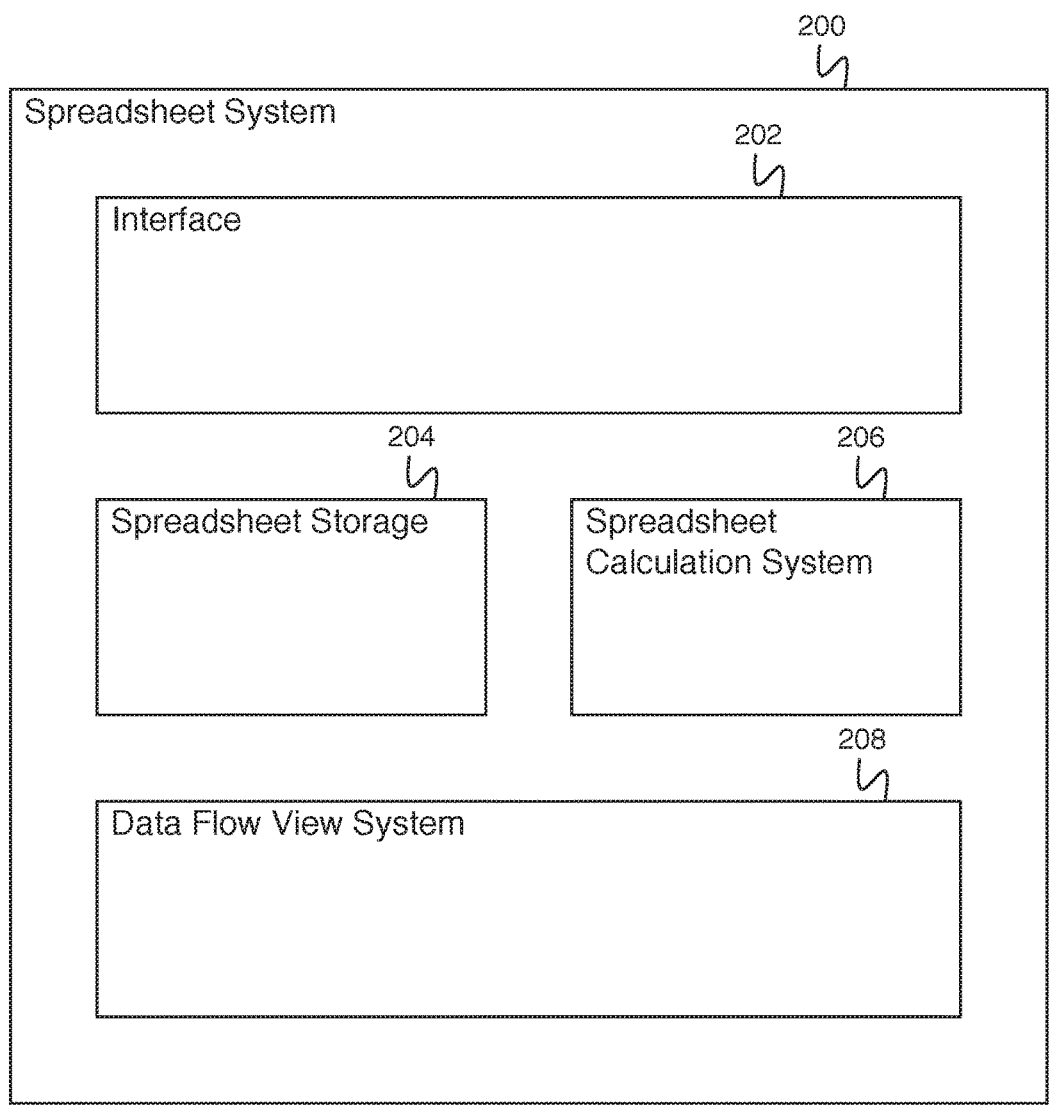
FIG. 2 is a block diagram illustrating an embodiment of a spreadsheet system.

FIG. 2 is a block diagram illustrating an embodiment of a spreadsheet system. In some embodiments, spreadsheet system 200 comprises a spreadsheet system 104 of FIG. 1. In the example shown, spreadsheet system 200 comprises interface 202. In various embodiments, interface 202 comprises an interface for receiving spreadsheet data, for receiving a request to perform spreadsheet calculations, for providing stored spreadsheet data, for providing spreadsheet calculation results, or for receiving or providing any other appropriate information. In some embodiments, interface 202 communicates with a processor (not shown). Spreadsheet system 200 additionally comprises spreadsheet storage 204. In various embodiments, spreadsheet storage 204 comprises a spreadsheet storage for storing spreadsheet data, for storing spreadsheet formulas, for storing the results of spreadsheet calculations, or for storing any other appropriate information. In some embodiments, spreadsheet storage 204 is implemented using a processor. In some embodiments, spreadsheet storage 204 is implemented using a memory. Spreadsheet calculation system 206 comprises a spreadsheet calculation system for performing spreadsheet calculations. In some embodiments, a spreadsheet calculation comprises a part of a spreadsheet (e.g., a formula for calculating a value for a spreadsheet cell). In some embodiments, a value for a spreadsheet cell is calculated by spreadsheet calculation system 206 from the values of other spreadsheet cells (e.g., the spreadsheet cell depends on other spreadsheet cells). In some embodiments, a value for a spreadsheet cell is calculated based at least in part on an external data source (e.g., an external database, a web page, cloud storage, etc.). In some embodiments, spreadsheet calculation system 206 is implemented using a processor. Data flow view system 208 comprises a system for providing data flow view information for a spreadsheet. In some embodiments, data flow view information comprises spreadsheet cell dependencies. In some embodiments, data flow view information comprises the spreadsheet cells that depend on a spreadsheet cell of interest. In some embodiments, data flow view information comprises the spreadsheet cells that a spreadsheet cell of interest depends on. In some embodiments, data flow view information comprises sheet level data flow information. In some embodiments, sheet level data flow information comprises a set of spreadsheet sheets with indicators of dependencies between sheets (e.g., in the event a cell in sheet B depends on a cell in sheet A, an arrow is drawn pointing from A to B). In some embodiments, data flow system 208 is implemented using a processor. In various embodiments, the elements of spreadsheet system 200 are all implemented using a single processor, are each implemented using their own processor, or are combined onto a plurality of processors in any other appropriate way. In some embodiments, spreadsheet system 200 additionally comprises a memory coupled to one or more processors. In various embodiments, the memory comprises a magnetic memory, an optical memory, a solid-state memory, a flash memory, a non-volatile memory, a read-only memory, a tape memory, a disc memory, or any other appropriate memory.

Figure 3:
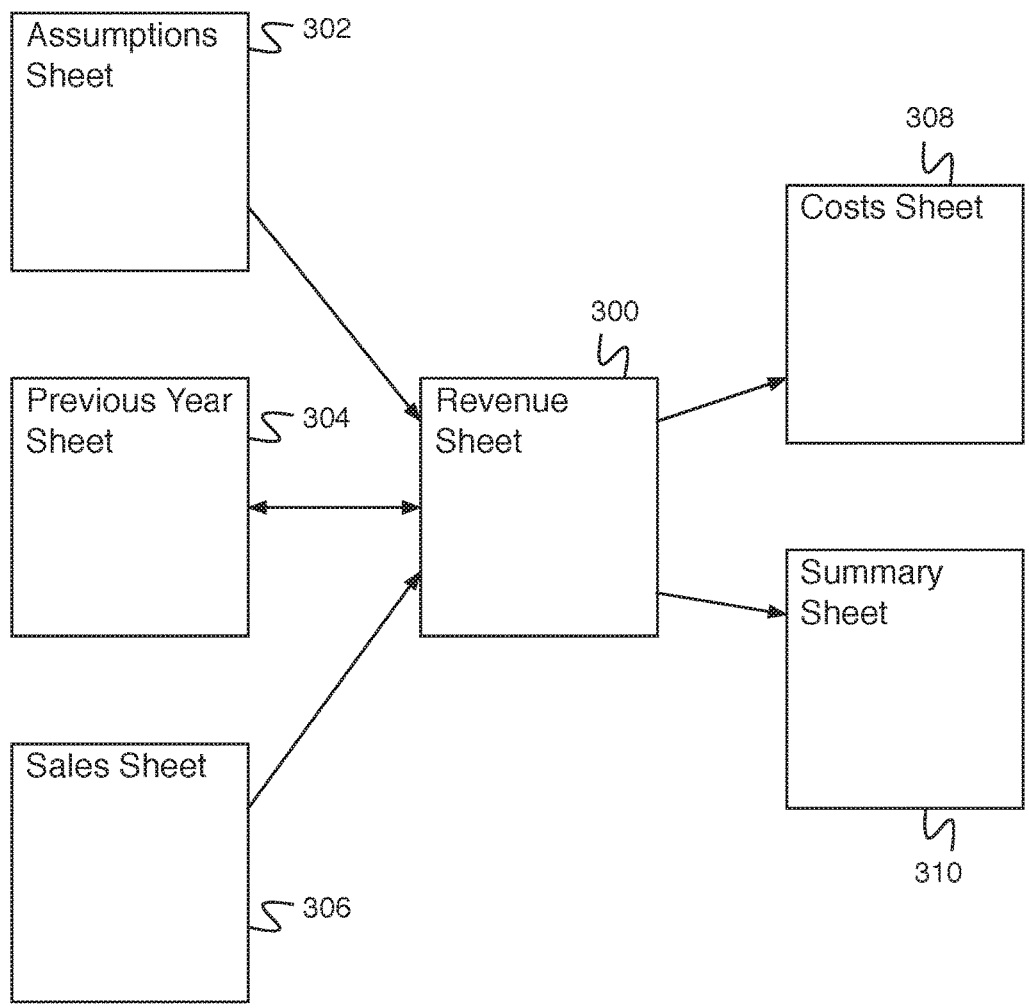
FIG. 3 is a diagram illustrating an embodiment of a spreadsheet data flow view.

FIG. 3 is a diagram illustrating an embodiment of a spreadsheet data flow view. In some embodiments, the spreadsheet data flow view of FIG. 3 comprises a spreadsheet data flow view of a spreadsheet created by a user using a user system. In some embodiments, the spreadsheet data flow view of FIG. 3 comprises a spreadsheet data flow view generated by a spreadsheet system. In the example shown, sheets of FIG. 3 comprise sheets of a spreadsheet and arrows indicate dependencies between cells of the sheets. In some embodiments, a spreadsheet data flow view displays all sheets of a spreadsheet. In some embodiments, a spreadsheet data flow view displays all dependencies related to a selected sheet of a spreadsheet. In the example shown, the spreadsheet data flow view focuses on revenue sheet 300. Revenue sheet 300 comprises cells that have dependencies on assumptions sheet 302, on previous year sheet 304, and on sales sheet 306. Previous year sheet 304, costs sheet 308, and summary sheet 310 comprise cells that have dependencies on revenue sheet 300. Since spreadsheet sheets comprise a plurality of cells, dependencies between sheets can go in both directions without cycles being introduced (e.g., revenue sheet 300 comprises a cell that depends on a cell in previous year sheet 304, and previous year sheet 304 comprises a different cell that depends on a cell in revenue sheet 300). In some embodiments, in the event an indication is received by the spreadsheet system to display dependencies related to a different sheet, the spreadsheet data flow view is redrawn focusing on the different sheet. In some embodiments, in the event an indication is received by the spreadsheet system to display a spreadsheet sheet, the spreadsheet sheet is displayed. In some embodiments, in the event an indication is received by the spreadsheet system to display dependencies between cells within a spreadsheet sheet, a spreadsheet cell data flow of the sheet is displayed.

Figure 4:
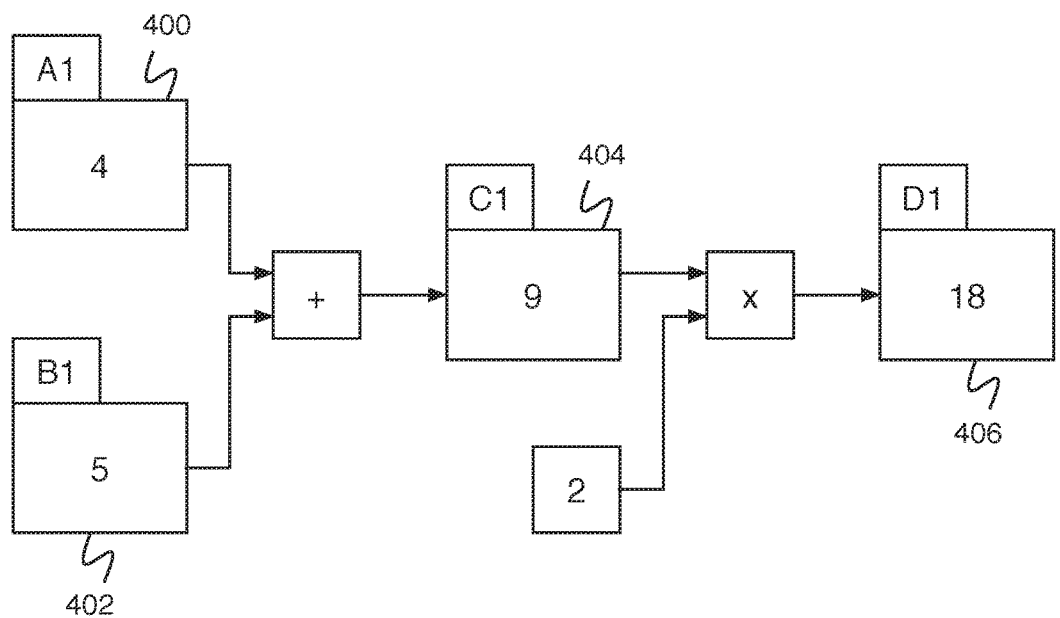
FIG. 4 is a diagram illustrating an embodiment of a spreadsheet cell data flow view.

FIG. 4 is a diagram illustrating an embodiment of a spreadsheet cell data flow view. In some embodiments, the cell level data flow view of FIG. 4 comprises a spreadsheet cell data flow view of a spreadsheet created by a user using a user system. In some embodiments, the spreadsheet cell data flow view of FIG. 4 comprises a spreadsheet cell data flow view created by a data flow view system. In some embodiments, the spreadsheet cell data flow view of FIG. 4 comprises a spreadsheet cell data flow view of a sheet of a spreadsheet (e.g., a sheet of the sheets of FIG. 3). In some embodiments, the spreadsheet cell data flow view of FIG. 4 comprises a spreadsheet cell data flow view of a portion of a spreadsheet. In the example shown, the spreadsheet cell data flow view of FIG. 4 comprises a spreadsheet cell data flow view focused on cell 404. The spreadsheet cell data flow view of FIG. 4 displays a set of cells that cell 404 depends on (e.g., cell 400 and cell 402, via the formula C1=A1+B1) and a set of cells that depend on cell 404 (e.g., cell 406, via the formula D1=C1×2). In some embodiments, in the event an indication is received to focus the spreadsheet cell data flow view on a different cell (e.g., cell 400, cell 402, cell 406), a new spreadsheet cell data flow view is created focusing on the indicated cell (e.g., showing cells the indicated cell depends on and showing cells that depend on the indicated cell). In some embodiments, in the event an indication is received to edit a cell, an interface is provided to edit the cell.

Figure 5:
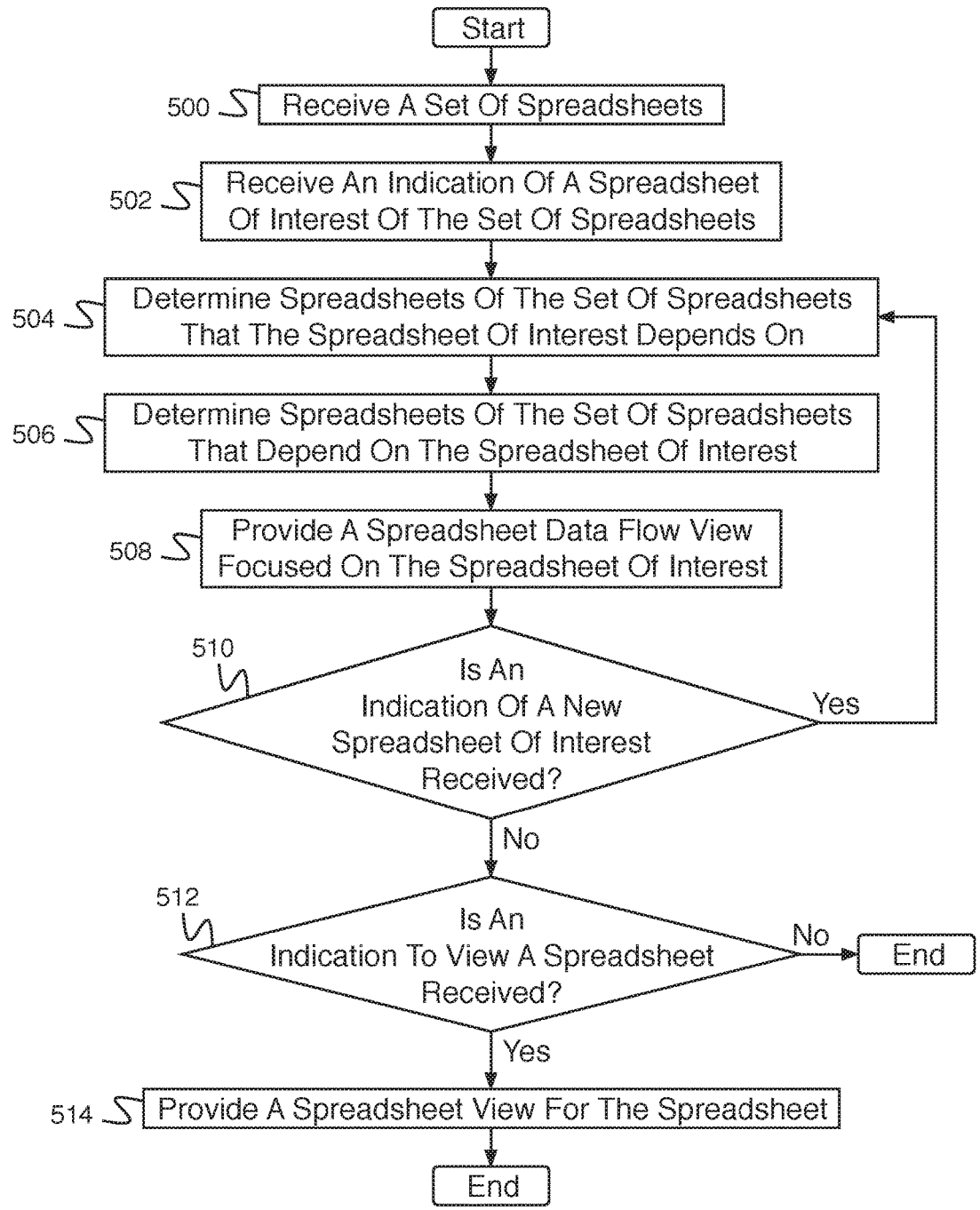
FIG. 5 is a flow diagram illustrating an embodiment of a process for providing a spreadsheet data flow view.

FIG. 5 is a flow diagram illustrating an embodiment of a process for providing a spreadsheet data flow view. In some embodiments, the process of FIG. 5 comprises a process for providing the spreadsheet data flow view of FIG. 3. In the example shown, in 500, a set of spreadsheets is received. In some embodiments, the set of spreadsheets comprises a set of related spreadsheets (e.g., a set of spreadsheets including dependencies). In 502, an indication of a spreadsheet of interest of the set of spreadsheets is received. In various embodiments, an indication of a spreadsheet of interest of the set of spreadsheets comprises a user selection from a list of spreadsheets, an indication to receive a sheet level data flow view from a spreadsheet view of the spreadsheet of interest, a determination of a default spreadsheet of interest, or any other appropriate indication of a spreadsheet of interest. In 504, spreadsheets of the set of spreadsheets that the spreadsheet of interest depends on are determined. In some embodiments, the spreadsheet of interest depends on a spreadsheet of the set of spreadsheets in the event that a cell of the spreadsheet of interest depends on a cell of the spreadsheet of the set of spreadsheets. In 506, spreadsheets of the set of spreadsheets that depend on the spreadsheet of interest are determined. In some embodiments, a spreadsheet of the set of spreadsheets can belong to both the set determined in 504 and the set determined in 506. In 508, a spreadsheet data flow view focused on the spreadsheet of interest is provided. In some embodiments, a spreadsheet data flow view comprises dependency display information. In some embodiments, dependency display information comprises spreadsheets determined in 504 and spreadsheets determined in 506. In some embodiments, dependency display information comprises a set of arrows pointing from spreadsheets to dependent spreadsheets. In some embodiments, spreadsheet access information is provided associated with the spreadsheet data flow view. In various embodiments, spreadsheet access information comprises spreadsheet creator information (e.g., a spreadsheet user that created the spreadsheet), spreadsheet write enabled information (e.g., spreadsheet users allowed to write to the spreadsheet), spreadsheet read enabled information (e.g., spreadsheet users allowed to read from the spreadsheet), or any other appropriate spreadsheet access information. In 510, it is determined whether an indication of a new spreadsheet of interest is received. In the event an indication of a new spreadsheet of interest is received, control passes to 504. In the event an indication of a new spreadsheet of interest is not received, control passes to 512. In 512, it is determined whether an indication to view a spreadsheet is received. In some embodiments, an indication to view a spreadsheet comprises an indication to switch from a spreadsheet data flow view to a spreadsheet view. In the event an indication to view a spreadsheet is not received, the process ends. In the event an indication to view a spreadsheet is received, control passes to 514. In 514, a spreadsheet view for the spreadsheet is provided. In some embodiments, in the event an indication to view a spreadsheet cell data source is received, spreadsheet cell data source reference information is provided. In various embodiments, spreadsheet cell data source reference information comprises spreadsheet cell creator information, spreadsheet cell data source database information, a spreadsheet cell database link, an associated spreadsheet cell database object, or any other appropriate spreadsheet cell data source reference information.

Figure 6:
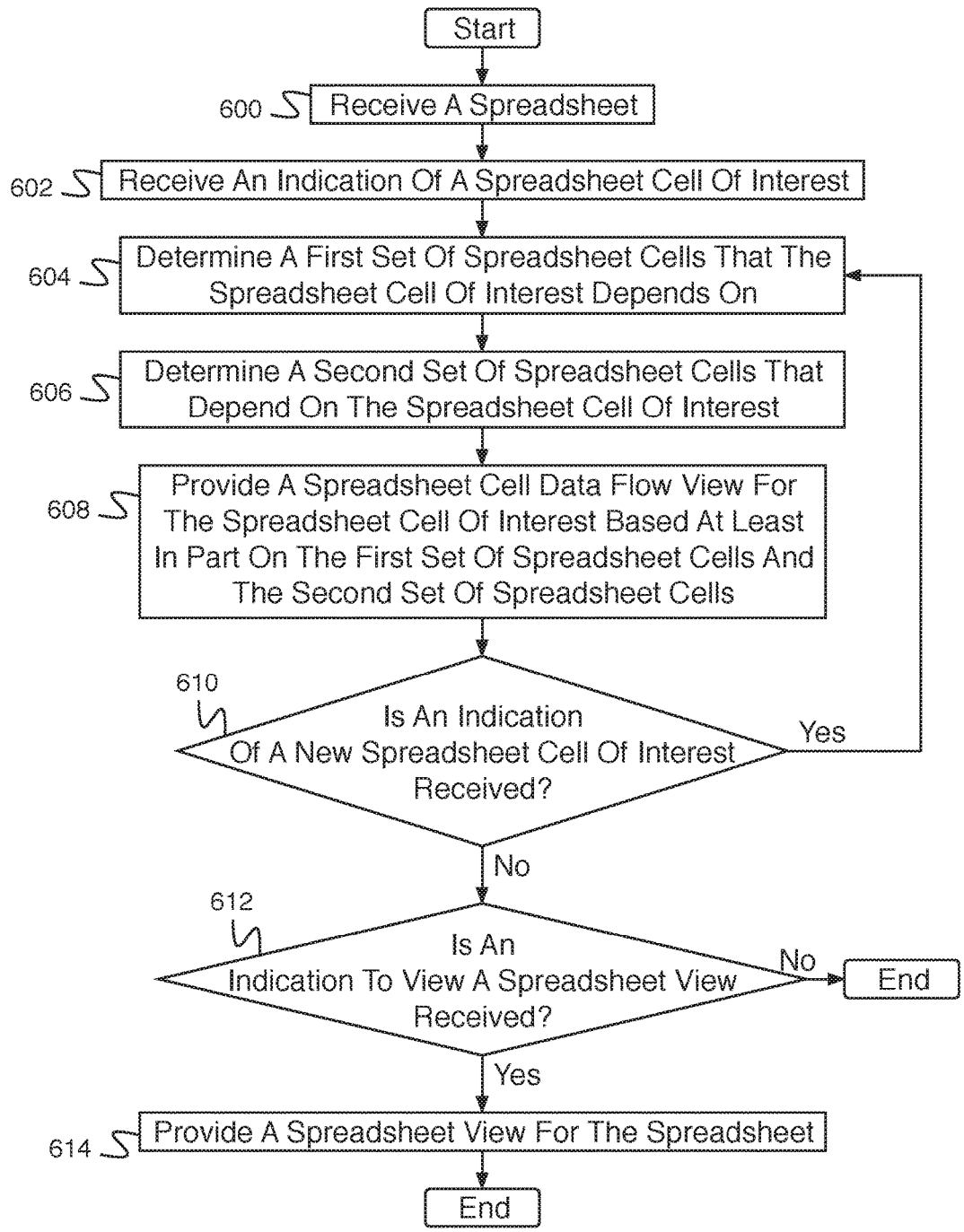
FIG. 6 is a flow diagram illustrating an embodiment of a process for providing a spreadsheet cell data flow view.

FIG. 6 is a flow diagram illustrating an embodiment of a process for providing a spreadsheet cell data flow view. In some embodiments, the process of FIG. 6 comprises a process for providing the spreadsheet cell data flow view of FIG. 4. In the example shown, in 600, a spreadsheet is received. In some embodiments, the spreadsheet comprises a spreadsheet of a set of spreadsheets. In 602, an indication of a spreadsheet cell of interest is received. In some embodiments, the indication of a spreadsheet cell of interest is received from a spreadsheet view (e.g., from a traditional view of the spreadsheet). In 604, a first set of spreadsheet cells that the spreadsheet cell of interest depends on is determined. In some embodiments, the first set of spreadsheet cells comprises all spreadsheet cells that the spreadsheet cell of interest depends on. In some embodiments, the first set of spreadsheet cells is displayed in a cell level data flow view on the left side of the spreadsheet cell of interest (e.g., as data dependencies flow left to right). In 606, a second set of spreadsheet cells that depend on the spreadsheet cell of interest is determined. In some embodiments, the second set of spreadsheet cells comprises all cells that depend on the spreadsheet cell of interest. In some embodiments, a cell cannot be part of both the set of cells determined in 604 and the set of cells determined in 606. In some embodiments, the second set of spreadsheet cells is displayed in a cell level data flow view on the right side of the spreadsheet cell of interest. In 608, a spreadsheet cell data flow view for the spreadsheet cell of interest is provided based at least in part on the first set of spreadsheet cells and the second set of spreadsheet cells. In some embodiments, the spreadsheet cell data flow view is based at least in part on security information. In some embodiments, a determination of whether a cell is part of the first set of spreadsheet cells or whether a cell is part of the second set of spreadsheet cells is based at least in part on security information (e.g., if the user requesting the spreadsheet cell data flow view is not allowed to access a cell, the cell is never included as part of the first set of spreadsheet cells or the second set of spreadsheet cells). In some embodiments, a label (e.g., a row label or a column label) associated with a spreadsheet cell of the spreadsheet is determined. In some embodiments, the spreadsheet cell data flow view is based at least in part on the label (e.g., the label is shown associated with its associated cell of the spreadsheet). In 610, it is determined whether an indication of a new spreadsheet cell of interest is received. In the event it is determined that an indication of a new spreadsheet cell of interest is received, control passes to 604. In the event it is determined that an indication of a new spreadsheet cell of interest is not received, control passes to 612. In 612, it is determined whether an indication to view a spreadsheet view is received. In some embodiments, in the event it is determined that an indication to view a spreadsheet view is not received, the process ends. In the event it is determined that an indication to view a spreadsheet view is received, control passes to 614. In 614, a spreadsheet view for the spreadsheet is provided. In some embodiments, in the event an indication to edit a spreadsheet cell is received, an interface to edit the spreadsheet cell is provided. In some embodiments, a spreadsheet cell data flow view comprises multiple levels of dependencies (e.g., not just cells that depend on the spreadsheet cell of interest, but cells that depend on those cells). In some embodiments, a spreadsheet cell data flow view comprises all spreadsheet cells, regardless of the number of levels of dependencies. In some embodiments, a spreadsheet cell data flow view comprises a user-defined number of levels of dependencies (e.g., a system user indicates the number of levels of dependencies desired to be shown). In some embodiments, a spreadsheet cell data flow view comprises only spreadsheet cells of interest at each dependency level.

Figure 7:
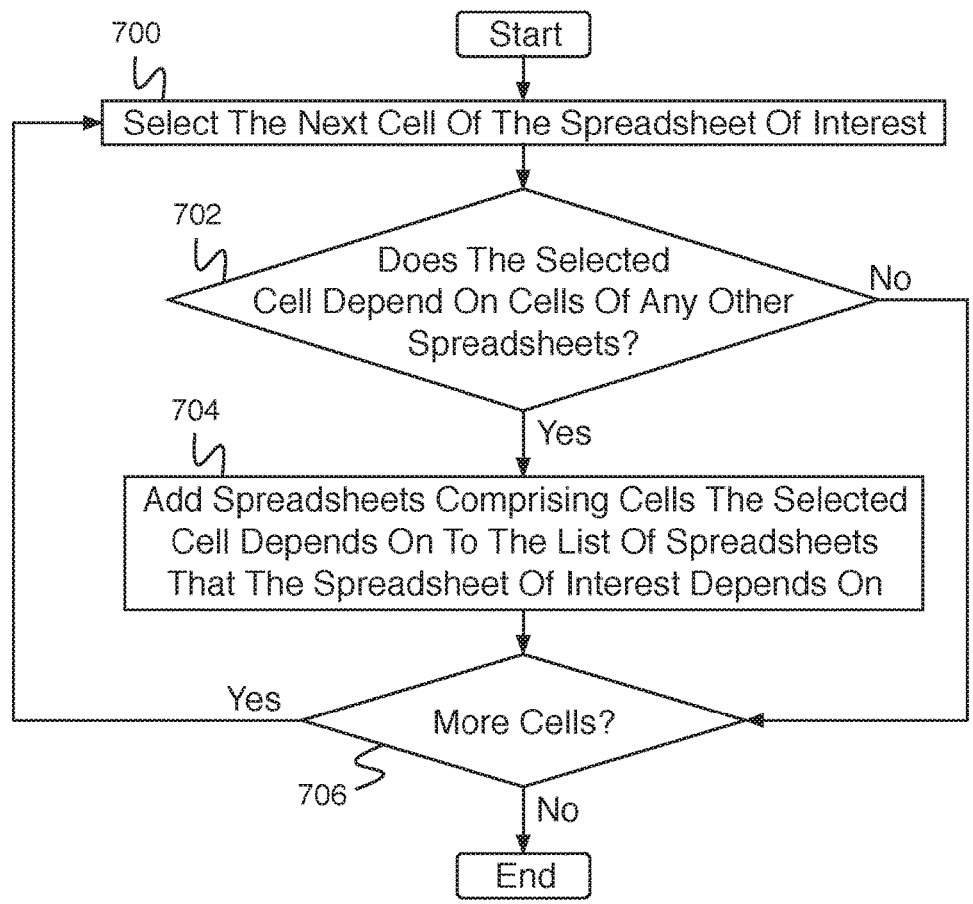

FIG. 7 is a flow diagram illustrating an embodiment of a process for determining spreadsheets of a set of spreadsheets that a spreadsheet of interest depends on. In some embodiments, the process of FIG. 7 implements 504 of FIG. 5. In the example shown, in 700, the next cell of the spreadsheet of interest is selected. In some embodiments, the next cell comprises the first cell. In 702, it is determined whether the selected cell depends on cells of any other spreadsheets (e.g., any other spreadsheets of the set of spreadsheets). In the event it is determined that the selected cell does not depend on cells of any other spreadsheets, control passes to 706. In the event it is determined that the selected cell depends on cells of other spreadsheets, control passes to 704. In 704, spreadsheets comprising cells the selected cell depends on are added to the list of spreadsheets that the spreadsheet of interest depends on. In 706, it is determined whether there are more cells in the spreadsheet of interest. In the event it is determined that there are more cells in the spreadsheet of interest, control passes to 700. In the event it is determined that there are not more cells in the spreadsheet of interest, the process ends.

In some embodiments, each spreadsheet of the set of spreadsheets comprises a list of other spreadsheets the spreadsheet depends on. The list is empty when the spreadsheet is created. When a spreadsheet cell is modified, it is determined whether the modification changes the list of other spreadsheets the spreadsheet depends on (e.g., adds a spreadsheet to the list or removes a spreadsheet from the list). Determining spreadsheets of the set of spreadsheets that a spreadsheet of interest depends on then comprises reading the list associated with the spreadsheet of interest.

In some embodiments, a spreadsheet of interest depending on an other spreadsheet indicates that a cell of the spreadsheet of interest depends on a cell of the other spreadsheet.

Figure 8:
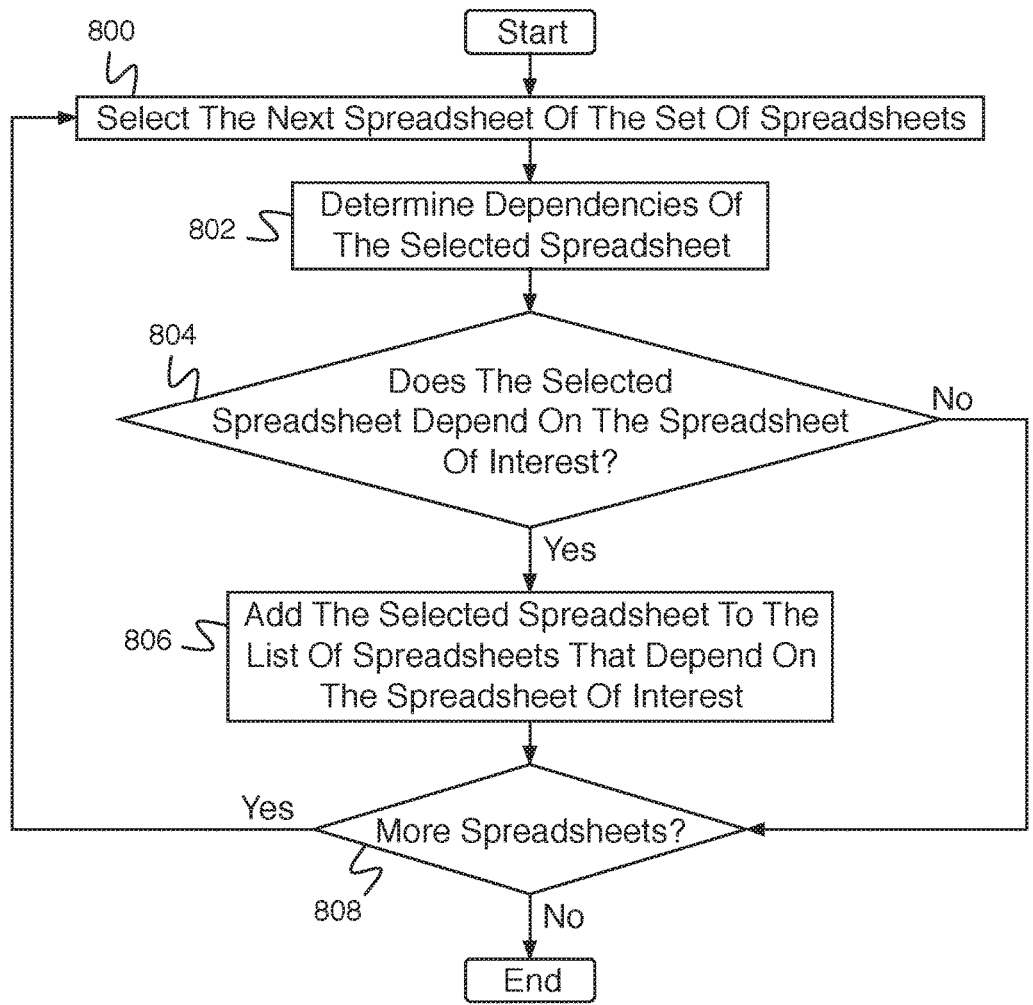
FIG. 8 is a flow diagram illustrating an embodiment of a process for determining spreadsheets of a set of spreadsheets that depend on a spreadsheet of interest.

FIG. 8 is a flow diagram illustrating an embodiment of a process for determining spreadsheets of a set of spreadsheets that depend on a spreadsheet of interest. In some embodiments, the process of FIG. 8 implements 506 of FIG. 5. In the example shown, in 800, the next spreadsheet of the set of spreadsheets is selected. In some embodiments, the next spreadsheet comprises the first spreadsheet. In 802, dependencies of the selected spreadsheet are determined. In some embodiments, dependencies of the selected spreadsheet are determined by determining dependencies of each cell of the selected spreadsheet. In some embodiments, dependencies of the selected spreadsheet are determined by accessing a dependency list associated with the spreadsheet (e.g., the list is updated each time the dependencies of the cells of the spreadsheet are updated). In 804, it is determined whether the selected spreadsheet depends on the spreadsheet of interest (e.g., whether the spreadsheet of interest is included in the dependencies determined in 802). In the event it is determined that the selected spreadsheet does not depend on the spreadsheet of interest, control passes to 808. In the event it is determined that the selected spreadsheet depends on the spreadsheet of interest, control passes to 806. In 806, the selected spreadsheet is added to the list of spreadsheets that depend on the spreadsheet of interest. In 808, it is determined whether there are more spreadsheets (e.g., in the set of spreadsheets). In the event it is determined that there are more spreadsheets, control passes to 800. In the event it is determined that there are not more spreadsheets, the process ends.

Figure 9:
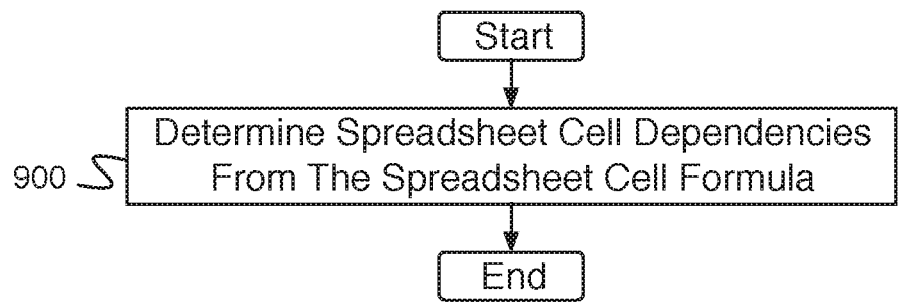

FIG. 9 is a flow diagram illustrating an embodiment of a process for determining a first set of spreadsheet cells that a spreadsheet cell of interest depends on. In some embodiments, the process of FIG. 9 implements 604 of FIG. 6. In the example shown, in 900, spreadsheet cell dependencies are determined from the spreadsheet cell formula. In some embodiments, the spreadsheet cell formula comprises the definition of the calculation stored by the spreadsheet cell, including any dependencies of the spreadsheet cell. In some embodiments, a spreadsheet cell of interest depending on an other spreadsheet cell indicates that the cell formula of the spreadsheet cell of interest comprises a dependency on the other spreadsheet cell (e.g., a formula in a first cell includes a reference to a second cell, a third cell is referred to in a formula in a fourth cell, etc.).

Figure 10:
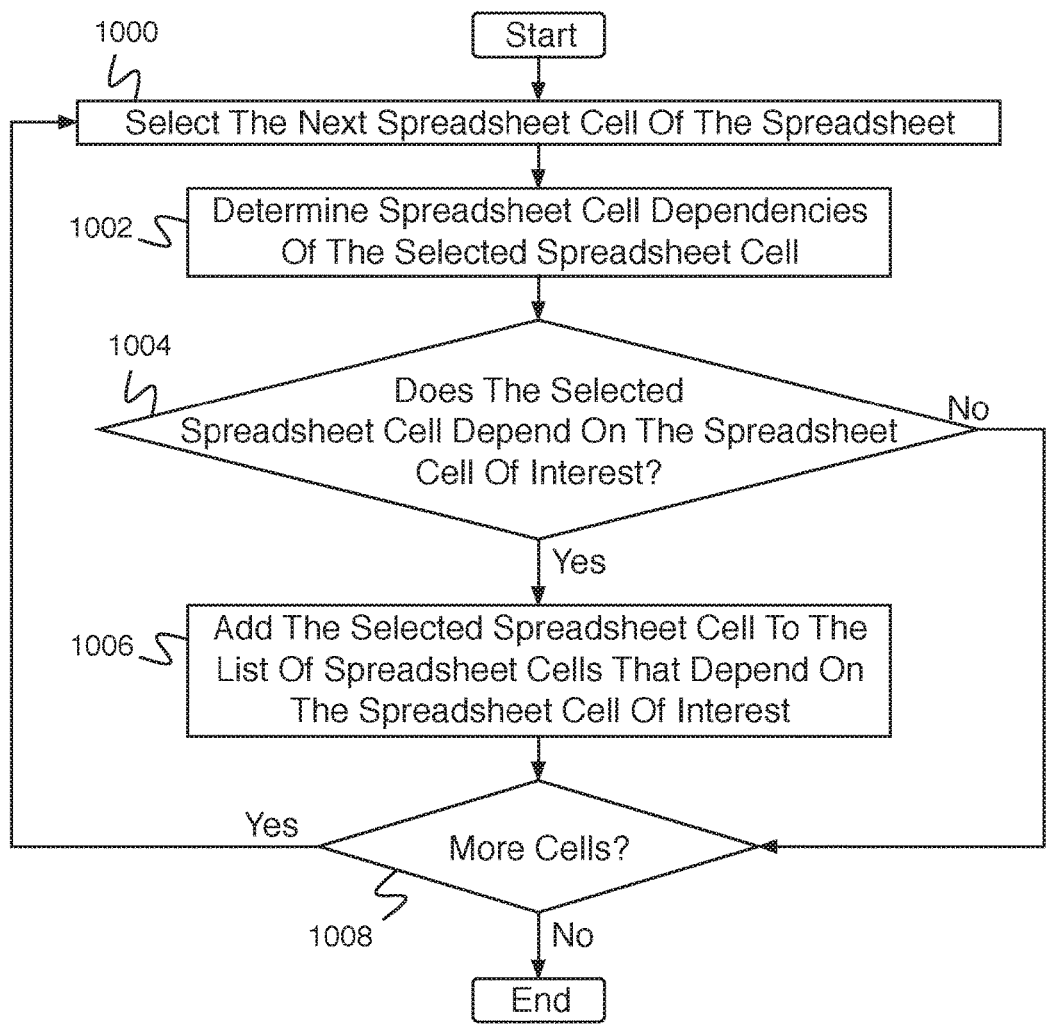
FIG. 10 is a flow diagram illustrating an embodiment of a process for determining a second set of spreadsheet cells that depend on a spreadsheet cell of interest.

FIG. 10 is a flow diagram illustrating an embodiment of a process for determining a second set of spreadsheet cells that depend on a spreadsheet cell of interest. In some embodiments, the process of FIG. 10 implements 606 of FIG. 6. In the example shown, in 1000, the next spreadsheet cell of the spreadsheet (e.g., the spreadsheet comprising the spreadsheet cell of interest) is selected. In some embodiments, the next spreadsheet cell comprises the first spreadsheet cell. In 1002, spreadsheet cell dependencies of the selected spreadsheet cell are determined. In some embodiments, spreadsheet cell dependencies are determined from the spreadsheet cell formula. In 1004, it is determined whether the selected spreadsheet cell depends on the spreadsheet cell of interest (e.g., whether the spreadsheet cell of interest is included in the dependencies determined in 1002). In the event it is determined that the selected spreadsheet cell does not depend on the spreadsheet cell of interest, control passes to 1008. In the event it is determined that the selected spreadsheet cell depends on the spreadsheet cell of interest, control passes to 1006. In 1006, the selected spreadsheet cell is added to the list of spreadsheet cells that depend on the spreadsheet cell of interest. In 1008, it is determined whether there are more cells. In the event it is determined that there are more cells, control passes to 1000. In the event it is determined that there are not more cells, the process ends.

Figure 11:
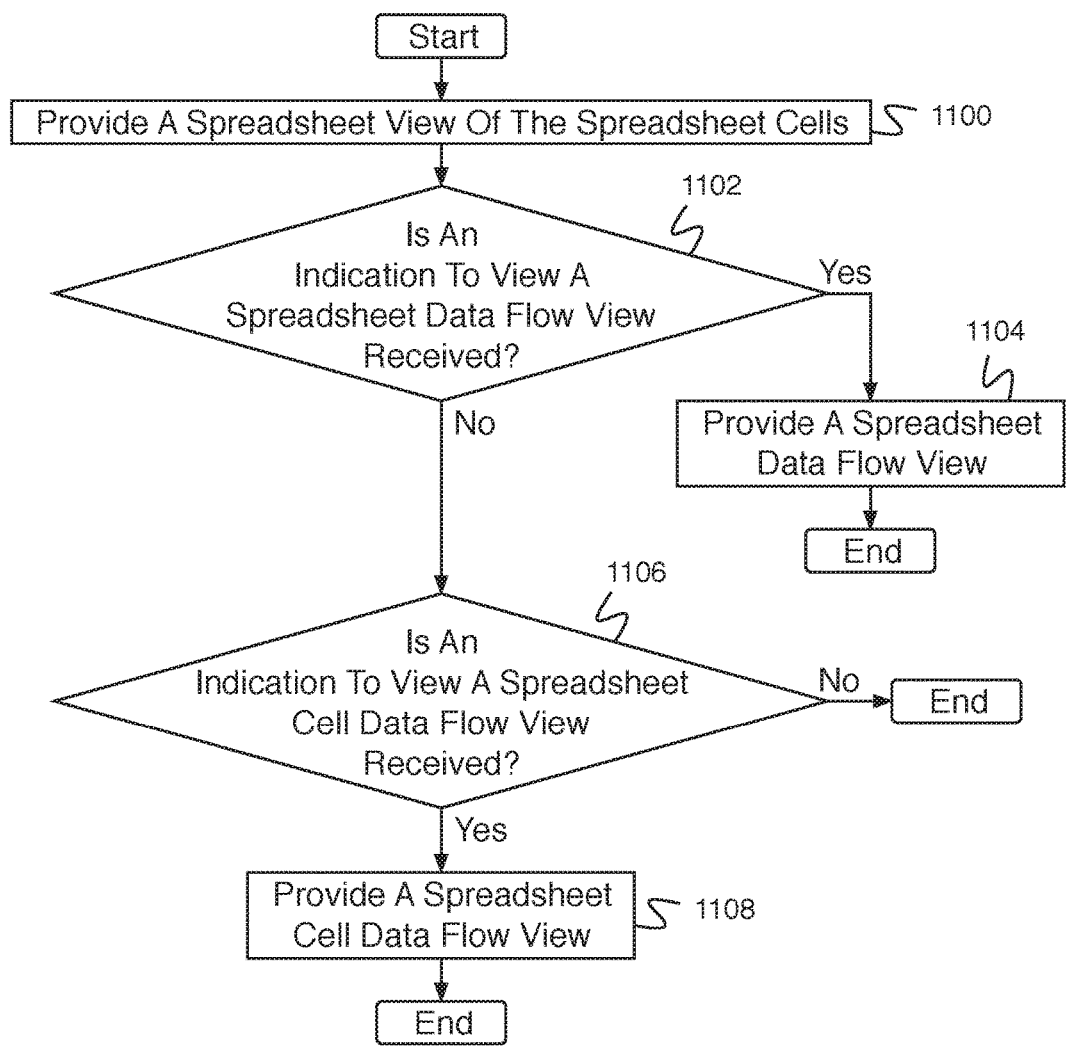
FIG. 11 is a flow diagram illustrating an embodiment of a process for providing a spreadsheet view for a spreadsheet.

FIG. 11 is a flow diagram illustrating an embodiment of a process for providing a spreadsheet view for a spreadsheet. In some embodiments, the process of FIG. 11 implements 614 of FIG. 6 or 514 of FIG. 5. In the example shown, in 1100, a spreadsheet view of the spreadsheet cells is provided (e.g., displaying spreadsheet cells in a traditional grid layout). In 1102, it is determined whether an indication to view a spreadsheet data flow view is received. In the event it is determined that an indication to view a spreadsheet data flow view is not received, control passes to 1106. In the event it is determined that an indication to view a spreadsheet data flow view is received, control passes to 1104. In 1104, a spreadsheet data flow view is provided (e.g., according to the process of FIG. 5), and the process ends. In 1106, it is determined whether an indication to view a spreadsheet cell data flow view is received. In the event it is determined that an indication to view a spreadsheet cell data flow view is not received, the process ends. In the event it is determined that an indication to view a spreadsheet cell data flow view is received, control passes to 1108. In 1108, a spreadsheet cell data flow view is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a data flow view for a spreadsheet, comprising:
    an input interface to receive a first spreadsheet and an indication of a spreadsheet cell of interest being located on the first spreadsheet; and
    a processor to:
        determine a first set of spreadsheet cells that the spreadsheet cell of interest depends on, comprising to:
            determine whether a first cell of the spreadsheet cell of interest depends on a second cell of a second spreadsheet, the first spreadsheet being different from the second spreadsheet; and
            in response to a determination that the first cell of the spreadsheet cell of interest depends on a second cell of second spreadsheet, add the second cell to the first set of spreadsheet cells;
        determine a second set of spreadsheet cells that depends on the spreadsheet cell of interest, comprising to:
            determine whether a third cell of third spreadsheet depends on the first cell of the spreadsheet cell of interest, the third spreadsheet being different from the first spreadsheet; and
            in response to a determination that the third cell of third spreadsheet depends on the first cell of the spreadsheet cell of interest, add the third cell to the second set of spreadsheet cells;
        determine whether a fourth cell of the first set of spreadsheet cells matches a fifth cell of the second set of spreadsheet cells;
        in response to a determination that the fourth cell matches the fifth cell, omit including the fourth cell in the first set of spreadsheet cells or the fifth cell in the second set of spreadsheet cells;
        provide a spreadsheet cell data flow view for the spreadsheet cell of interest based at least in part on the first set of spreadsheet cells and the second set of spreadsheet cells, comprising to:
            determine a new first set of spreadsheet cells that a new spreadsheet cell of interest depends on, wherein a first arrow indicates that the new spreadsheet cell of interest depends on a spreadsheet cell of the new first set of spreadsheet cells; and
            determine a new second set of spreadsheet cells that depends on the new spreadsheet cell of interest, wherein a second arrow indicates that a spreadsheet cell of the new second set of spreadsheet cells depends on the new spreadsheet cell of interest; and
        in response to a determination that an indication of a new spreadsheet cell of interest is received:
            provide a spreadsheet cell data flow view for the new spreadsheet cell of interest.

2. The system of claim 1, wherein the processor is further to:
    in response to a determination that an indication to edit a spreadsheet cell is received:
        provide an interface for editing the spreadsheet cell.

3. The system of claim 1, wherein the processor is further to:
    receive a set of spreadsheets and an indication of a spreadsheet of interest of the set of spreadsheets;
    determine spreadsheets of the set of spreadsheets that depend on the spreadsheet of interest;
    determine spreadsheets of the set of spreadsheets that the spreadsheet of interest depends on; and
    provide a spreadsheet data flow view for the spreadsheet of interest, wherein spreadsheet data flow information is based at least in part on the spreadsheets of the set of spreadsheets that depend on the spreadsheet of interest and the spreadsheets of the set of spreadsheets that the spreadsheet of interest depends on.

4. The system of claim 3, wherein the processor is further to:
    in response to a determination that an indication to view a spreadsheet is received:
        provide a spreadsheet view for the spreadsheet.

5. The system of claim 3, wherein the processor is further to:
    in response to a determination that an indication of a new spreadsheet of interest is received:
        provide a spreadsheet data flow view for the new spreadsheet of interest.

6. The system of claim 3, wherein the spreadsheet data flow view comprises a spreadsheet data flow view for all spreadsheets of the set of spreadsheets.

7. The system of claim 3, wherein the processor is further to provide spreadsheet access information associated with the spreadsheet data flow view.

8. The system of claim 3, wherein the processor is further to:
    in response to a determination that an indication to view a spreadsheet cell data flow view for a spreadsheet cell is received:
        provide the spreadsheet cell data flow view for the spreadsheet cell.

9. The system of claim 1, wherein the processor is further to:
    in response to a determination that an indication to view a spreadsheet cell data source is received:
        provide spreadsheet cell data source reference information.

10. The system of claim 1, wherein the spreadsheet cell data flow view is based at least in part on security information.

11. The system of claim 1, wherein the processor is further to determine a label associated with a spreadsheet cell of the spreadsheet.

12. The system of claim 11, wherein the spreadsheet cell data flow view is based at least in part on the label.

13. The system of claim 11, wherein the label comprises a row label.

14. The system of claim 11, wherein the label comprises a column label.

15. The system of claim 1, wherein the spreadsheet cell of interest depending on another spreadsheet cell indicates that a cell formula of the spreadsheet cell of interest comprises a dependency on the other spreadsheet cell.

16. The system of claim 1, wherein a value for a spreadsheet cell is calculated based at least in part on an external data source.

17. The system of claim 1, wherein the processor is further configured to:
- determine whether a user has access rights to access a sixth cell; and
- in response to a determination that the user does not have access rights to access the sixth cell, omit including the sixth cell in the first set of spreadsheet cells and the second set of spreadsheet cells.

18. A method for a data flow view for a spreadsheet, comprising:
- receiving a first spreadsheet and an indication of a spreadsheet cell of interest being located on the first spreadsheet;
- determining, using a processor, a first set of spreadsheet cells that the spreadsheet cell of interest depends on, comprising:
  - determining whether a first cell of the spreadsheet cell of interest depends on a second cell of a second spreadsheet, the first spreadsheet being different from the second spreadsheet; and
  - in response to a determination that the first cell of the spreadsheet cell of interest depends on a second cell of second spreadsheet, adding the second cell to the first set of spreadsheet cells;
- determining a second set of spreadsheet cells that depends on the spreadsheet cell of interest, comprising:
  - determining whether a third cell of third spreadsheet depends on the first cell of the spreadsheet cell of interest, the third spreadsheet being different from the first spreadsheet; and
  - in response to a determination that the third cell of third spreadsheet depends on the first cell of the spreadsheet cell of interest, adding the third cell to the second set of spreadsheet cells;
- determining whether a fourth cell of the first set of spreadsheet cells matches a fifth cell of the second set of spreadsheet cells;
- in response to a determination that the fourth cell matches the fifth cell, omitting including the fourth cell in the first set of spreadsheet cells or the fifth cell in the second set of spreadsheet cells;
- providing a spreadsheet cell data flow view for the spreadsheet cell of interest based at least in part on the first set of spreadsheet cells and the second set of spreadsheet cells, comprising:
  - determining a new first set of spreadsheet cells that a new spreadsheet cell of interest depends on, wherein a first arrow indicates that the new spreadsheet cell of interest depends on a spreadsheet cell of the new first set of spreadsheet cells; and
  - determining a new second set of spreadsheet cells that depends on the new spreadsheet cell of interest, wherein a second arrow indicates that a spreadsheet cell of the new second set of spreadsheet cells depends on the new spreadsheet cell of interest; and
- in response to a determination that an indication of a new spreadsheet cell of interest is received:
  - providing a spreadsheet cell data flow view for the new spreadsheet cell of interest.

19. A computer program product for threading spreadsheet calculations, the computer program product being embodied in a non-transitory computer readable storage medium and comprising computer instructions for:
- receiving a first spreadsheet and an indication of a spreadsheet cell of interest being located on the first spreadsheet;
- determining a first set of spreadsheet cells that the spreadsheet cell of interest depends on, comprising:
  - determining whether a first cell of the spreadsheet cell of interest depends on a second cell of a second spreadsheet, the first spreadsheet being different from the second spreadsheet; and
  - in response to a determination that the first cell of the spreadsheet cell of interest depends on a second cell of second spreadsheet, adding the second cell to the first set of spreadsheet cells;
- determining a second set of spreadsheet cells that depends on the spreadsheet cell of interest, comprising:
  - determining whether a third cell of third spreadsheet depends on the first cell of the spreadsheet cell of interest, the third spreadsheet being different from the first spreadsheet; and
  - in response to a determination that the third cell of third spreadsheet depends on the first cell of the spreadsheet cell of interest, adding the third cell to the second set of spreadsheet cells;
- determining whether a fourth cell of the first set of spreadsheet cells matches a fifth cell of the second set of spreadsheet cells;
- in response to a determination that the fourth cell matches the fifth cell, omitting including the fourth cell in the first set of spreadsheet cells or the fifth cell in the second set of spreadsheet cells;
- providing a spreadsheet cell data flow view for the spreadsheet cell of interest based at least in part on the first set of spreadsheet cells and the second set of spreadsheet cells, comprising:
  - determining a new first set of spreadsheet cells that a new spreadsheet cell of interest depends on, wherein a first arrow indicates that the new spreadsheet cell of interest depends on a spreadsheet cell of the new first set of spreadsheet cells; and
  - determining a new second set of spreadsheet cells that depends on the new spreadsheet cell of interest, wherein a second arrow indicates that a spreadsheet cell of the new second set of spreadsheet cells depends on the new spreadsheet cell of interest; and
- in response to a determination that an indication of a new spreadsheet cell of interest is received:
  - providing a spreadsheet cell data flow view for the new spreadsheet cell of interest.

* * * * *